United States Patent [19]
Bonetti

[11] 4,265,403
[45] May 5, 1981

[54] CONTROLLED IRRIGATION SYSTEM FOR A PREDETERMINED AREA

[75] Inventor: Ralph A. Bonetti, Littleton, Colo.

[73] Assignee: Advanced Products Development Corporation, Littleton, Colo.

[21] Appl. No.: 37,388

[22] Filed: May 9, 1979

[51] Int. Cl.³ .................... A01G 25/16; B05B 3/04; B05B 15/04

[52] U.S. Cl. .................. 239/66; 137/624.14; 239/70; 239/97; 239/206; 239/236; 239/239; 239/241; 239/551; 239/DIG. 1

[58] Field of Search .............. 137/624.14, 624.18, 137/624.19; 239/66, 67, 70, 97, 204–207, 236, 237, 239, 246, 248, 263, 264, 266, 551, 563, DIG. 1

[56] References Cited

U.S. PATENT DOCUMENTS

| | | | |
|---|---|---|---|
| 2,393,091 | 1/1946 | De Lacy-Mulhall | 239/66 |
| 2,414,052 | 1/1947 | Martin | 239/206 |
| 2,731,294 | 1/1956 | Rothweiler | 239/97 |
| 2,805,098 | 9/1957 | Hurley | 239/236 X |
| 3,362,641 | 1/1968 | Barnes | 239/97 |
| 3,398,894 | 8/1968 | D'Agaro | 239/97 |
| 3,405,871 | 10/1968 | Mullan | 239/236 |
| 3,452,930 | 7/1969 | Karbo | 239/70 |
| 3,575,347 | 4/1971 | Carlson | 239/97 |
| 3,580,504 | 5/1971 | Benham | 239/70 |
| 3,952,954 | 4/1976 | Taylor | 239/DIG. 1 X |
| 3,960,327 | 6/1976 | Olson | 239/236 |
| 3,964,685 | 6/1976 | Chauvigne | 239/66 |

*Primary Examiner*—Andres Kashnikow
*Attorney, Agent, or Firm*—John E. Reilly

[57] ABSTRACT

A lawn sprinkler system has a plurality of sprinkler heads connected to a common water supply line. The sprinkling or irrigation, the rate of rotation and the contour of the area sprinkled all are controlled at each sprinkler head. A timer valve associated with a manually adjustable control setting regulates the sprinkling cycle at each head in response to rotation of the head, following which water is bypassed to the next sprinkler head in succession. Further, each sprinkler head contains a rotatable nozzle assembly which is adjustable to provide a spray pattern which will conform to different contours or areas to be sprinkled by each head independently of the other heads in the line in such a way as to afford the greatest possible water efficiency. The sprinkler head is driven or rotated by a water-operated motor which is responsive to the flow of water under pressure into the head to impart continuous rotation to the nozzle assembly throughout the sprinkler cycle and can be varied in speed by regulating the flow rate of water through the motor.

30 Claims, 14 Drawing Figures

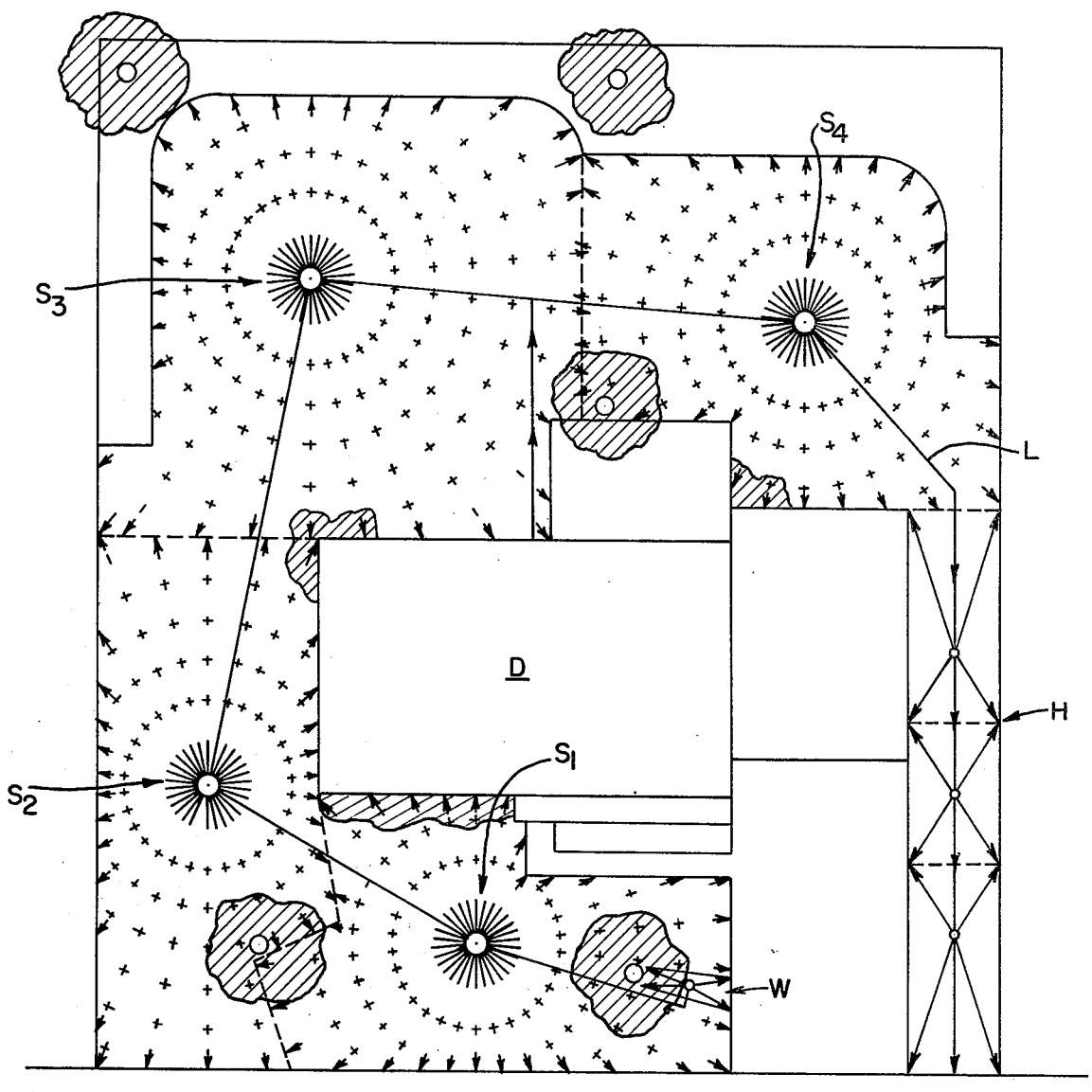
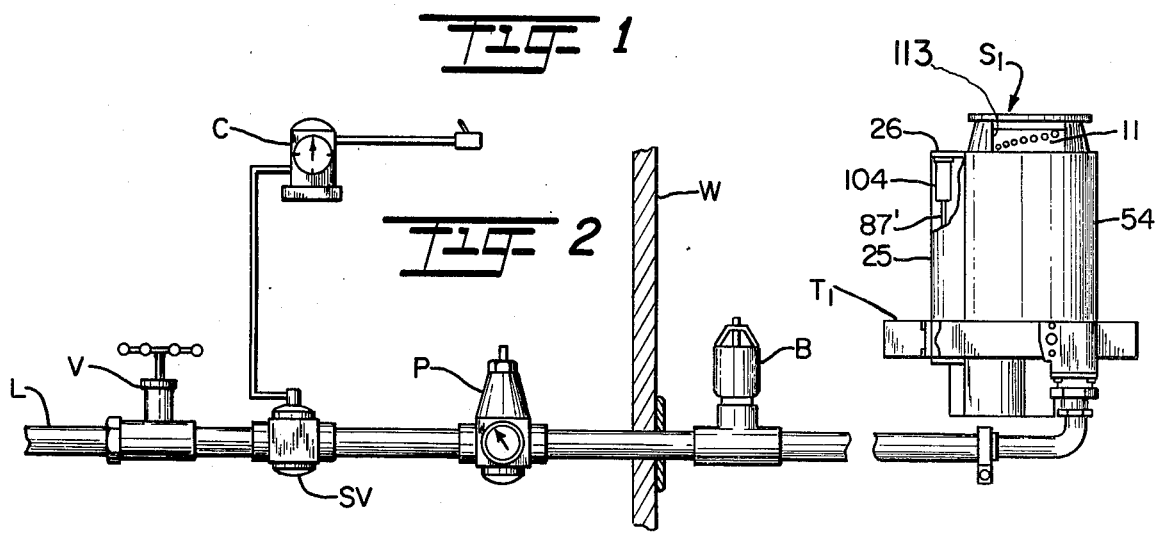
FIG. 1
FIG. 2

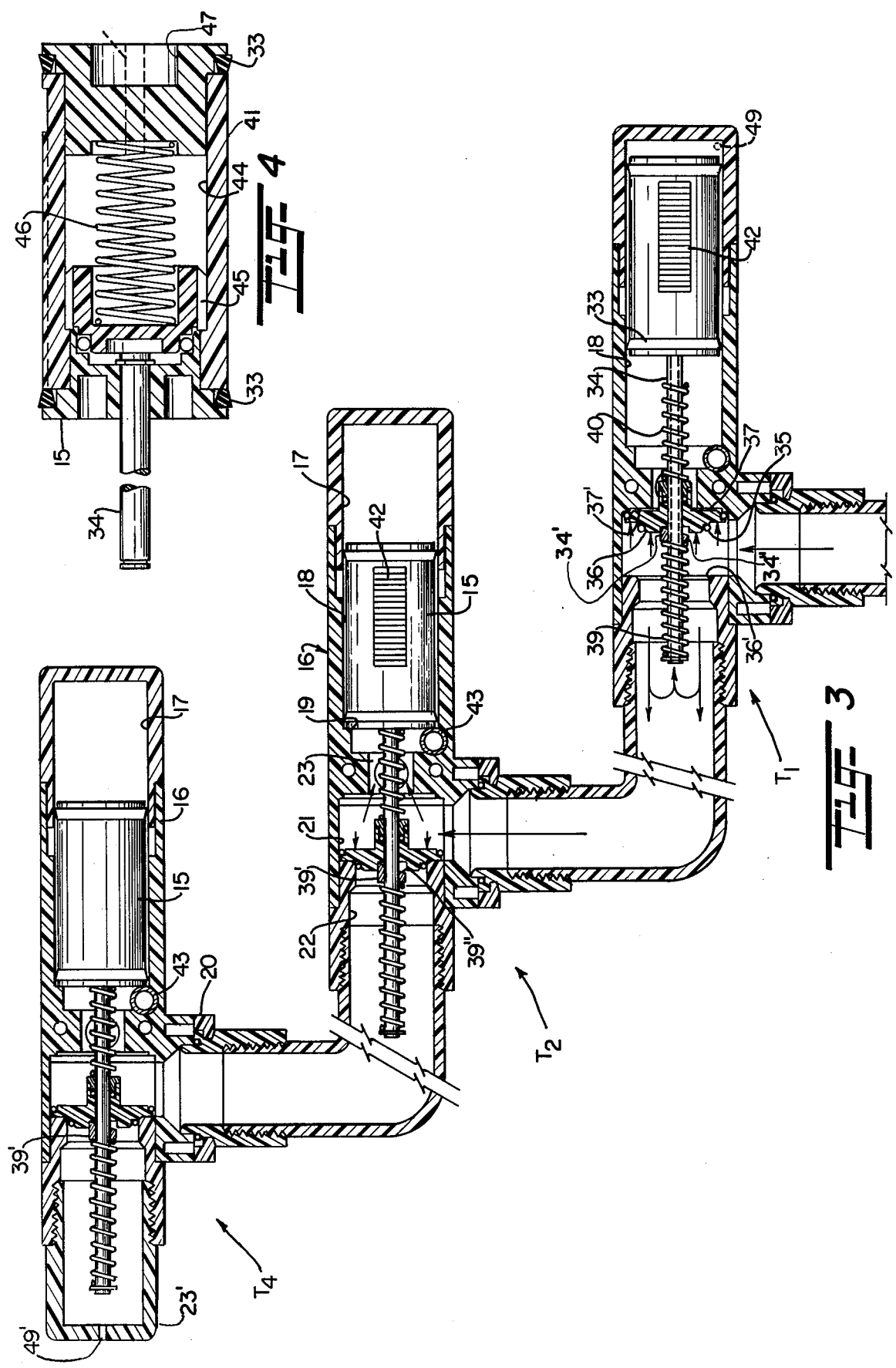

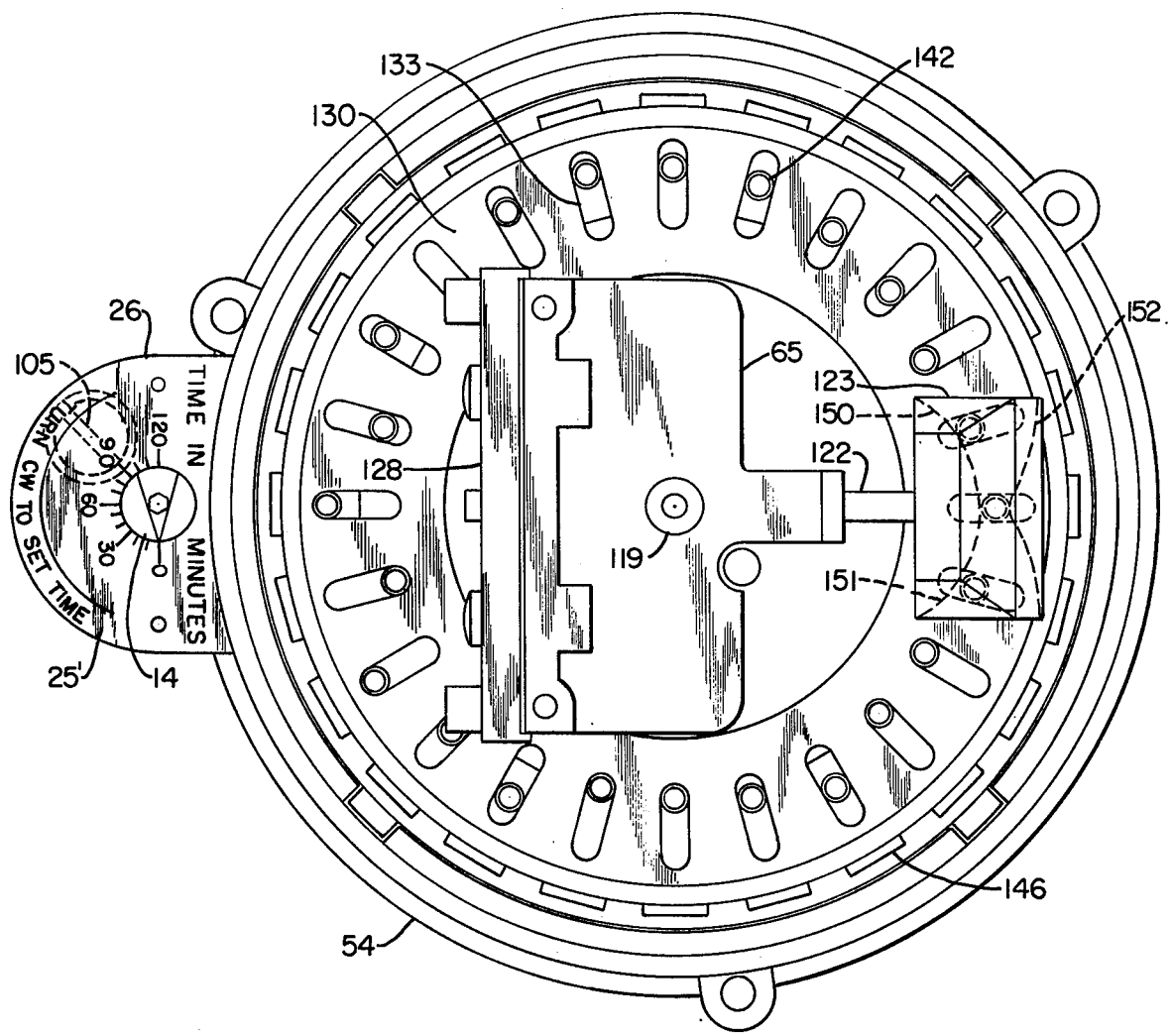
FIG. 11
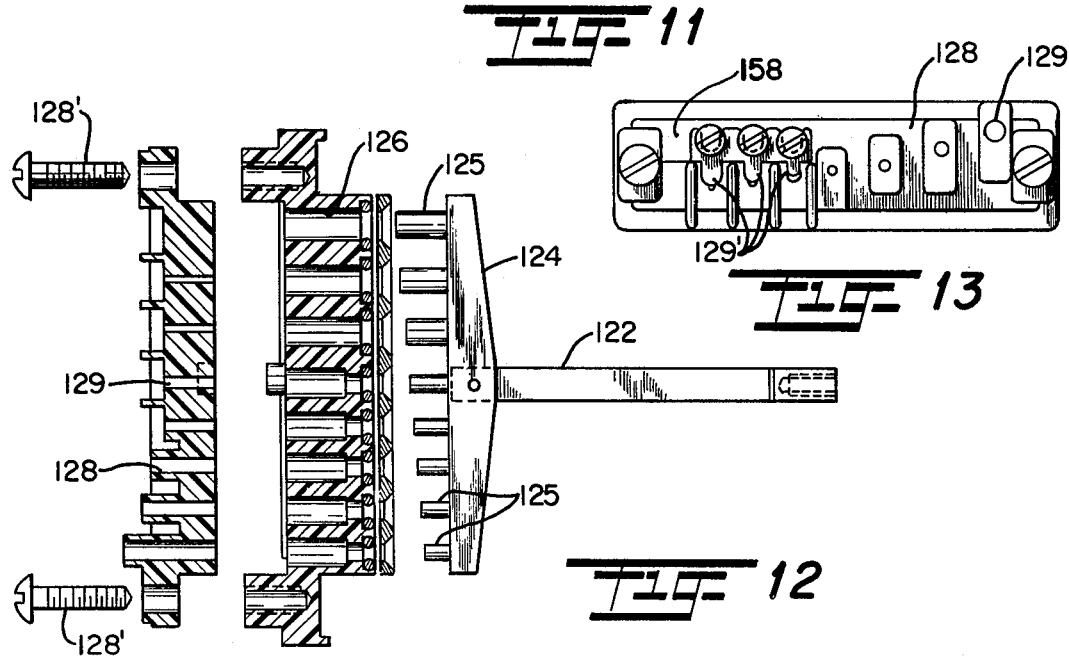
FIG. 12
FIG. 13

CONTROLLED IRRIGATION SYSTEM FOR A PREDETERMINED AREA

This invention relates to irrigation systems and more particularly relates to a sprinkler installation of the type in which a plurality of sprinkler heads are mounted in series to a common source of water supply.

BACKGROUND OF THE INVENTION

Modern demands upon energy conservation and particularly efficient utilization of water resources make it imperative that irrigation or sprinkler installations be operated with a minimum of external power and be capable of uniform distribution of water precisely over the area or pattern to be irrigated. In order to achieve maximum water efficiency in a sprinkler installation, the water stream must be confined to the contour or area which requires watering and must be uniformly distributed over that area. Various sprinkler systems have been designed which are capable of being adjustable or conformable to different contours or patterns to be sprinkled and these generally take the approach of a rotatable pop-up type sprinkler head having multi-hole nozzle assemblies which are rotated and, as the area or radial distance away from the sprinkler head is either increased or reduced a greater or lesser number of nozzle holes are open for the discharge of water. Typical of this approach is U.S. Letters Patent to Taylor U.S. Pat. No. 3,952,954 wherein an automatic sprinkler has a plurality of fingers which are bent to vary the radius of the spray as a function of its rotation, and a speed control unit having a positive displacement hydraulic brake varies the rotational speed of the sprinkler according to the area of lawn being watered at any given time. U.S. Letters Patent to Carlson U.S. Pat. No. 3,575,347 employs a cam controlled nozzle assembly in a sprinkler head in which a plate has a stair-step configuration and can be progressively advanced across the ends of the nozzle openings to control the area over which the stream is discharged from the nozzle assembly. Other patents which take similar approaches to Carlson are Olson U.S. Pat. No. 3,960,327; Hurley U.S. Pat. No. 2,805,098; Martin U.S. Pat. No. 2,414,052 and Mullan U.S. Pat. No. 3,405,871 as well as the patent to Karbo U.S. Pat. No. 3,452,930. For example, Karbo utilizes a plurality of pins as cam control elements in which the radial position of the pins will control the pattern of water discharged by the sprinkler head.

U.S. Letters Patent to Dagaro U.S. Pat. No. 3,398,894 is directed to an automatic sprinkler having an adjustable cam-controlled spray, while the patent to Barnes U.S. Pat. No. 3,362,641 discloses a plurality of nozzles in a sprinkler head which are progressively opened or blocked by a piston as the piston is raised or lowered by linkage connected to a water operated motor drive. Rothweiler U.S. Pat. No. 2,731,294 also discloses a sprinkler head having a nozzle assembly in which the nozzle orifices are inclined at various angles so as to produce jets of water which strike the ground at various distances from the sprinkler head. None of these arrangements, however, disclose a system which is capable of establishing uniform water distribution notwithstanding variations in the area or pattern sprayed as the sprinkler head is continuously rotated and particularly in such a way as to effect distribution in that area immediately surrounding the sprinkler head; and at the same time it is desirable that the nozzle assembly can be closely controlled to undergo rapid variations in the amount and pattern of water distributed while assuring smooth transition in the flow and pattern of water discharged at closely spaced circumferential intervals throughout each full revolution.

Moreover, in order to minimize external power requirements while assuring maximum utilization of the water, it is highly desirable that the sprinkler heads be connected in series to a common water supply line. Not only does this eliminate considerable installation time and labor in running individual lines to different points of an area to be irrigated from a common water supply source, but also eliminates necessity for a separate timer control at the water source in cycling water successively through each individual line. Previously, systems have been designed in which a plurality of sprinkler heads are series-connected to a common line, such as, U.S. Letters Patent to Chauvigne U.S. Pat. No. 3,964,685 where each sprinkler head in the line has a clapper type valve which is responsive to the volume and pressure of fluid to automatically cut each sprinkler head off and to divert the water to the next successive sprinkler head. In this relation, it is desirable that the cycle of each series-connected sprinkler head be controlled independently of fluid flow or pressure at each head and where the timer system at each head can be accurately regulated and controlled without an external power source; and further to do so in such a way that the timer control for each head is operated directly off the power drive of a contour controlled sprinkler.

SUMMARY OF THE INVENTION

It is therefore an object of the present invention to provide a novel and improved irrigation system which is capable of establishing close coordination between the volume of water available and the area to be irrigated over a predetermined time interval.

Another object of the present invention is to provide for a novel and improved sprinkler system in which the amount of water sprayed over a given unit of time is regulated according to the area to be irrigated by programming a series of nozzles arranged at different angles in a common rotatable nozzle assembly; and further wherein the nozzle assembly is capable of covering the widest possible area from a point immediately adjacent to the sprinkler head carrying the nozzle assembly.

A further object of the present invention is to provide for a novel and improved timer/switch assembly to regulate the sprinkling cycle of a sprinkler head and wherein the timing can be regulated independently of variations in water line pressure or the area covered by the sprinkler.

A further object of the present invention is to provide in a sprinkler system for a series of sprinkler heads which are successively activated and programmed to irrigate different specific contours independently of the other heads and wherein a timer and switch assembly associated with each head is capable of accurately timing the individual sprinkling cycle of its sprinkler head and at the end of that cycle automatically transferring water to the next head in succession; and at the end of each overall sprinkling cycle of the system, all of the timers are automatically preset for the next sprinkling cycle.

A still further object of the present invention is to provide in a sprinkler system for a maximum water efficiency ratio by assuring uniform distribution of water over an entire area to be irrigated notwithstanding variations in the area or contour of the area to be sprinkled while accurately limiting water distribution to that area.

It is an additional object of the present invention to provide for a novel and improved sprinkler system in which a plurality of sprinkler heads are connected in series to a common source of water supply, each sprinkler head being accurately timed to divert water from the line through a nozzle assembly to cover a predetermined contour or area and wherein each sprinkler head is further characterized by containing its own timer and drive system which operate directly off the water pressure and require no separate source of power for timing or operation.

In accordance with the present invention, a preferred form of irrigation system resides in a lawn sprinkling installation made up of a plurality of sprinklers connected in series to a common water supply line, a timer valve and piston arrangement associated with each sprinkler which is normally open to divert water from the line to its associated sprinkler at the beginning of each cycle and in response to rotation of the sprinkler over a predetermined time interval will advance to a position closing the inlet to the sprinkler and permitting water to pass to the next sprinkler in succession. At the end of the cycle for each sprinkler, the timer is automatically reset after the end of the cycle while the next sprinkler is in operation. The last sprinkler includes its own reset to return to an open position for the next sprinkling system cycle. The system sprinkling cycle can be initiated by a main timer clock, manually, or by moistener sensing devices to open and close the main water supply.

In the preferred form, each sprinkler contains a unique water operated rotational drive piston by means of which the linear movement of the piston is converted to rotational motion. The piston has indexing racks on opposite sides engageable with pinions, each pinion operative to alternately rotate a main driven shaft for each direction of linear movement of the piston; or if desired, the same system can be employed to impart oscillation or reversible rotation to the sprinkler head.

A driven shaft is rotated continuously to drive a nozzle assembly in the sprinkler head, the nozzle assembly preferably made up a multi-hole nozzle extending in a generally radial direction with the openings at various different preselected angles to cover specified areas or distances away from the sprinkler head. A cam-controlled plunger assembly cooperates with the nozzle assembly whereby to selectively open and close the nozzle openings according to the contour or area to be irrigated during each cycle. Most desirably this is accomplished by a series of plungers of different lengths or different radial distances from the respective nozzle openings so that as the plungers are advanced toward the nozzle assembly the plungers will successively move into each nozzle opening to partially and then completely close the nozzle and thereby progressively reduce the area or distance irrigated. The nozzle assembly is compactly arranged by supporting it on a cam programmer which is capable of imposing extremely close control over the radial movement of the plungers, the programmer consisting of a series of pins which can be preset according to the desired pattern and work in cooperation with a unique venturi-shaped cam follower to impart precisely controlled incremental radial movement to the plunger assembly as the nozzle assembly is continuously rotated. The entire sprinkler head is so designed so as to be of the pop-up type with the water pattern having a low profile capable of emitting or discharging the water in the form of large droplets as opposed to a fine spray so as to minimize evaporation and wind effect.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a generally schematic plan view of a typical installation of a preferred form of sprinkler system in accordance with the present invention.

FIG. 2 is a view in more detail of the central water supply and associated controls for the preferred form of present invention.

FIG. 3 is a schematic illustration of a portion of the timer/switch assembly for a plurality of sprinkler heads connected in series to a common water supply source.

FIG. 4 is a cross-sectional view of the preferred form of timer piston employed in the timer/switch assembly of the present invention.

FIG. 11 is a plan view of the programmer and plunger block assembly which control the operation of the nozzle assembly in the preferred form of sprinkler head.

FIG. 12 is a view in more detail of the preferred form of nozzle and plunger assembly with portions of the nozzle assembly illustrated in cross-section; and FIG. 13 is a front view of the nozzle assembly.

DETAILED DESCRIPTION OF THE PREFERRED EMBODIMENT

Figure 6A:
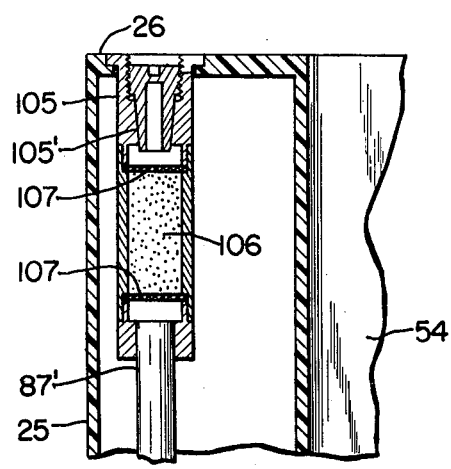
FIG. 6A is a fragmentary view of a portion of the housing for the sprinkler system beneath the timer dial.
Figure 5:
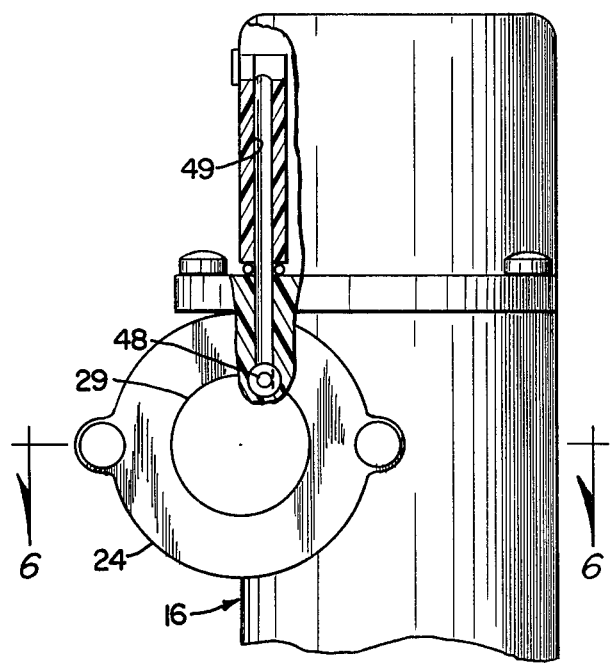
FIG. 5 is a fragmentary plan view partially in section of a portion of the cylinder body for the timer piston of the timer/switch assembly of the present invention.

Referring in detail to the drawings, the preferred form of the present invention comprises a system in which a plurality of sprinkler heads S are connected in series to a common water supply line L having an on-off valve V, a solenoid valve SV and pressure regulator P. In a typical installation, the on-off valve V, solenoid valve SV and pressure regulator P are installed inside the building, and a backflow preventer valve B is located in the main supply line L directly outside of the building. Each sprinkler head S is characterized by having a self-contained timer/switch system generally designated at T which is capable of diverting water from the main supply line into that sprinkler head over a predetermined time interval following which the timer T will interrupt the flow of water into its sprinkler head and permit the water to continue through the line L to the next sprinkler head in succession. Moreover, each sprinkler head is characterized by having a hydraulically operated power drive piston assembly 10 which imparts rotation to a nozzle block assembly 11 through a main vertical drive shaft 12, as shown in FIG. 7. The main drive shaft 12 simultaneously imparts rotation to a time setting shaft 14, shown in FIGS. 6 and 11, forming a part of the timer system T so as to coordinate the sprinkling cycle or period for each sprinkler head S with the rate of rotation of the head. It should be emphasized here that the power drive 11 associated with each sprinkler head S is operated off of the water flow from the main supply line and neither the power drive assembly nor the timer system requires a separate source of power or control. The only separate controls required are an on-off switch SV and a main or central timer represented at C which will regulate opening and closing of the main solenoid control valve SV at the beginning and end of each sprinkling cycle for the entire system, again as illustrated in FIG. 2.

In the somewhat diagrammatic representation of FIG. 1, there is illustrated a plan view of a lawn area to be irrigated or sprinkled surrounding a cluster of buildings represented at D. Sprinkler heads represented at $S_1$, $S_2$, $S_3$, and $S_4$ are connected in series to the common or main supply line L directly outside of the building wall W in the same manner as illustrated in FIG. 2. In addition, the last sprinkler head in series, $S_4$, is shown connected through the line L to a strip watering system represented at H and which forms no part of the present invention. The plan view of FIG. 1 however schematically illustrates the manner in which the spray pattern of each sprinkler head S may be adjusted to conform to different contours or areas of the lawn to be irrigated.

Figure 6:
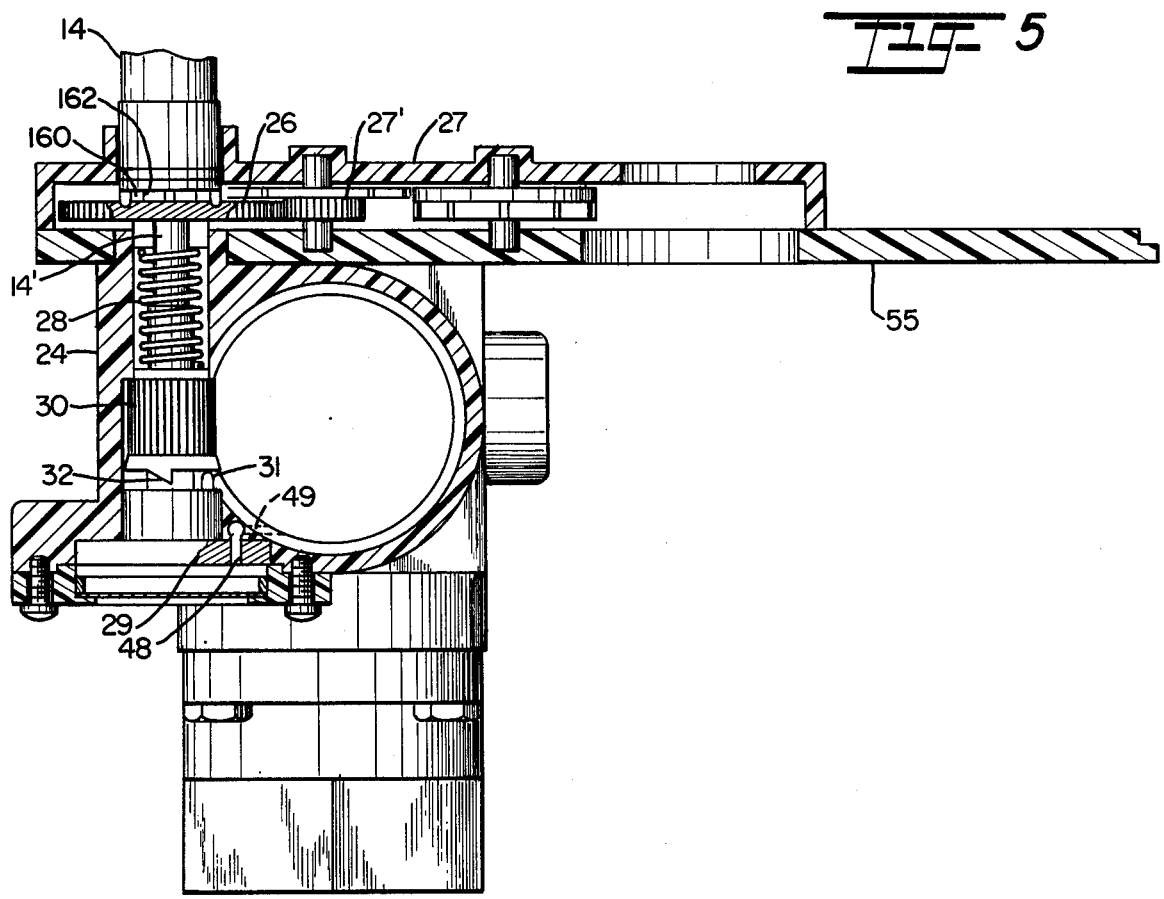
FIG. 6 is a cross-sectional view taken about lines 6—6 of FIG. 5.
Figure 7:
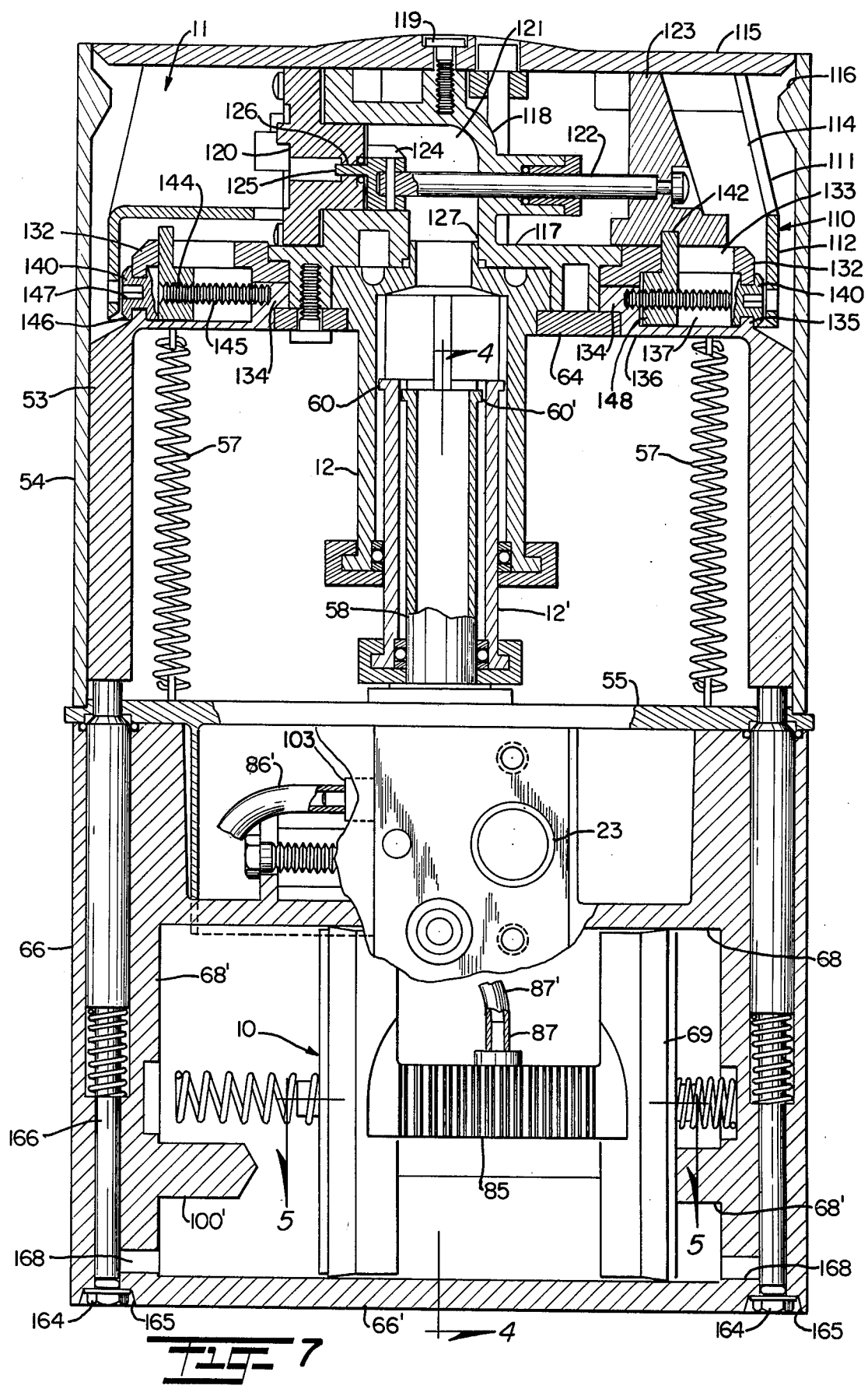
FIG. 7 is a vertical sectional view of a preferred form of sprinkler head.

The timer/switch T for each of the respective sprinkler heads $S_1$ to $S_4$ is illustrated in detail in FIGS. 3 to 7. Each timer/switch T comprises an elongated piston cylinder 16 for a timer piston 15, and the cylinder 16 is divided into a rear chamber 17, a front chamber 18 having an internal shoulder or piston stop 19, a laterally extending inlet port 20 which communicates with a valve chamber 21, and an upstream chamber 22 which leads into outlet port 23 to the main supply line L between the sprinkler heads. Communicating with the rear chamber 17 is a vertically extending, generally circular bore 24, as shown in FIG. 6, in which is positioned the lower end of the setting shaft 14.

In the preferred form, the elongated time setting 14 which extends upwardly through a tubular housing 25 on the outside of the sprinkler head housing 54, as shown in FIGS. 2 and 11. The upper end of the shaft 14 extends through a central opening 24' located on a cover plate 25' which forms a closure over the upper end of the tubular housing 25. A dial which displays time in minutes is displayed on the cover 25'. A spur gear 26 is releasably keyed to the timer shaft 14 and enclosed in a gear reduction housing 27 on circular mounting plate 55 of the sprinkler head, the gear 26 being driven off of a gear reducer mechanism generally designated at 27' from gear 59 located on the main drive shaft 12 of the sprinkler head as hereinafter described. The gear 26 is normally fixed for rotation with the upper end of the shaft 14 by positioning the gear 26 on a reduced portion 14' of the shaft, and a series of circumferentially spaced pins 160 project downwardly from the gear 26 so as to be movable into engagement with apertures in the upper surface of a collar 162 which is fixed to the portion 14' directly beneath the gear 26. Rotation of the gear 26 imparts rotation to the shaft 14 and, through clutch spring 28 on the timer shaft 14, to a lower timing disk 29 which is located directly above an index gear 30 journaled on the shaft 14. An upwardly directed, spring-loaded drive pin 31 is positioned on the timing disk 29 in the path of movement of a single clutch tooth 32 on the index gear 30. The index gear 30 is so positioned on the lower end of the shaft as to project into the interior of the rear chamber 17. When the timer shaft 14 is rotated by the gear 26 during operation of the sprinkler head S so as to cause the upper end of the shaft to gradually move counterclockwise toward zero from its initial time setting, the timing disk 29 moves independently of the index gear, and the drive pin 31 will merely override the clutch tooth 32 on the index gear. As will hereinafter become more apparent, rotation of the index gear in a clockwise direction will cause the tooth 32 to engage the pin 31 and impart rotation to the disk 29 as well as the entire shaft 14.

Movement of the time setting shaft 14 and index gear 30 is operative to control opening and closing of the valve chamber 21 through timer piston 15 which is arranged for axial movement through the elongated cylinder 16. Referring to FIG. 3, timer piston is defined by a piston head 41 provided with wedge-shaped O-ring seals 33 at opposite ends thereof, and a hollow elongated shaft 34 extends forwardly from the piston head through front chamber 18 into the upstream chamber 22. A timer valve member 35 is slidably mounted on an intermediate portion of the shaft 34 and is provided with a first valve seating surface 36 adapted to seat against valve seat 36' leading into the upstream chamber, and a second seating surface 37 which is adapted to seat against and establish sealed engagement with valve seat 37' between the valve chamber and discharge port 23 to the sprinkler head. A compression spring 39 is mounted on the shaft 34 between the front end of the shaft and a sleeve 34' having an inclined edge 34" abutting the valve member 35; also a second spring 40 is mounted under compression between the rearward side of the valve member and a stop member directly in front of the piston 15. The inclined edge 34" exerts an uneven force against the valve to encourage opening or tipping of the valve so as to permit water to flow past the edge in shifting it from the piston as shown at timer $T_2$ to that shown at Timer $T_1$.

It will be noted that the piston block 15 is provided with an indexing rack 42 extending axially along the external surface of the block and consisting of a series of vertically extending teeth adapted to intermesh with the teeth on the index gear 26. FIG. 4 illustrates the internal construction and arrangement of the piston head 15. The piston is hollow so as to define a chamber 44 for mounting of a check valve 45 which is spring-loaded by compression spring 46 so as to be normally urged to a closed position across the front face of the chamber directly behind the rearward end of piston shaft 34. In turn the rearward end of the piston block has an axially extending bore 47 which communicates with the chamber directly behind the check valve 45. It will be seen that the check valve 45 is sized so that when retracted away from the front end of the chamber it will permit passage of water under pressure from the hollow shaft 34 through the chamber and into the bore 47 so as to fill up the rear chamber 17 of the cylinder. This will occur in a manner to be described when sufficient back pressure is developed in the line ahead of the timer piston to overcome the spring force of the check valve.

Referring to the operation of the timer/switch T, each timer/switch will be automatically set with the timer valve 36 engaging the front valve seat 36' prior to the beginning of a sprinkling cycle. When water under pressure is delivered through the main line to the first timer $T_1$ it will therefore pass through the inlet port 20, the valve chamber 21 and through the port 23 to the sprinkler head thereby imparting rotation to the drive sleeve 12 of the sprinkler head $S_1$. Assuming that the timer is set for a sprinkling cycle of 60 minutes on the dial, the timer shaft will start to rotate slowly in a counterclockwise direction and impart rotation to the lower timing disk 29. Throughout the sprinkling cycle, water is entrapped in the rear chamber 17 of the cylinder 16 so as to resist rearward movement of the piston head 41. However, when the sprinkler has completed its cycle and the timer returns to zero, a water drain hole 48 on the timing disk is aligned with a drain hole 49 in the chamber so as to allow the water in the rear chamber to drain and thus allow the timer piston 15 to move rearwardly thereby compressing the spring 40 and forcing the timer valve seating surface 37 from the position of timer $T_2$ into the position of timer $T_1$ as shown in FIG. 3. This interrupts the flow of water to the sprinkler head $S_1$ and diverts it through the upstream chamber 22 to the main line extending into sprinkler head $S_2$. As the piston 15 is caused to move rearwardly, the indexing rack 42 will engage the index gear 30 causing its clutch tooth 32 to override the drive pin 31 so that the timing disk remains stationary and the sprinkler head will continue to drain to atmosphere through the drain valve opening 49. Finally, the water pressure exerted on the hollow shaft 34 will unseat the check valve 45 within the piston block 15 so as to permit water to collect in the rear chamber 17 behind the piston thereby reversing the movement of the piston and returning it to its original disposition against the valve seat 37'; or in other words, the position shown at $T_2$ and thereby closing the drain valve 49. As the piston block 15 returns to its original disposition, index gear 30 is rotated and bears against the drive pin 31 so as to rotate the timing disk 29 as well as the timer shaft 14 back to its original position in preparation for the next cycle. Concurrently, any water in the sprinkler head is free to drain through the outlet port 43 is front of the timer piston. In the alternative, the drain valve 34 may be eliminated and the water permitted to drain back through the main line L to an external drain valve, not shown, for the system. All this will occur during the sprinkling cycle of the next sprinkler $S_2$ as the back pressure in the line L increases.

When the last sprinkler head $S_4$ has completed its cycle, water is diverted into a cap 23' provided with a drain hole 49' to permit water to bleed through the hole 49' so as to allow the sprinkler $S_4$ to recock itself before the main valve is closed. The entire sprinkler system is now ready to repeat itself when the system is reactivated. The maximum time setting of 120 minutes on the dial 26 represents a movement of 180° of the time setting shaft 14 in returning to zero. However when the piston head 15 is returned to its rearwardmost position, the clutch tooth 32 on the timing disk 29 will catch up to the drive pin 31 and drive it to its original setting as the piston returns to its original position. Of course the compression spring 40 will exert pressure against the timer valve and can only return the valve to its original open position when water from the main supply valve is turned off. In order to set the timer shaft 14 for a particular time interval it is necessary to lift the upper end of the shaft until it becomes disengaged from the spur gear 26 so that it can be rotated independently of the gear 26. Once set, the shaft is then depressed to cause the pins 160 to be inserted into the openings 162 in the spur gear.

SPRINKLER HEAD ASSEMBLY

Figure 8:
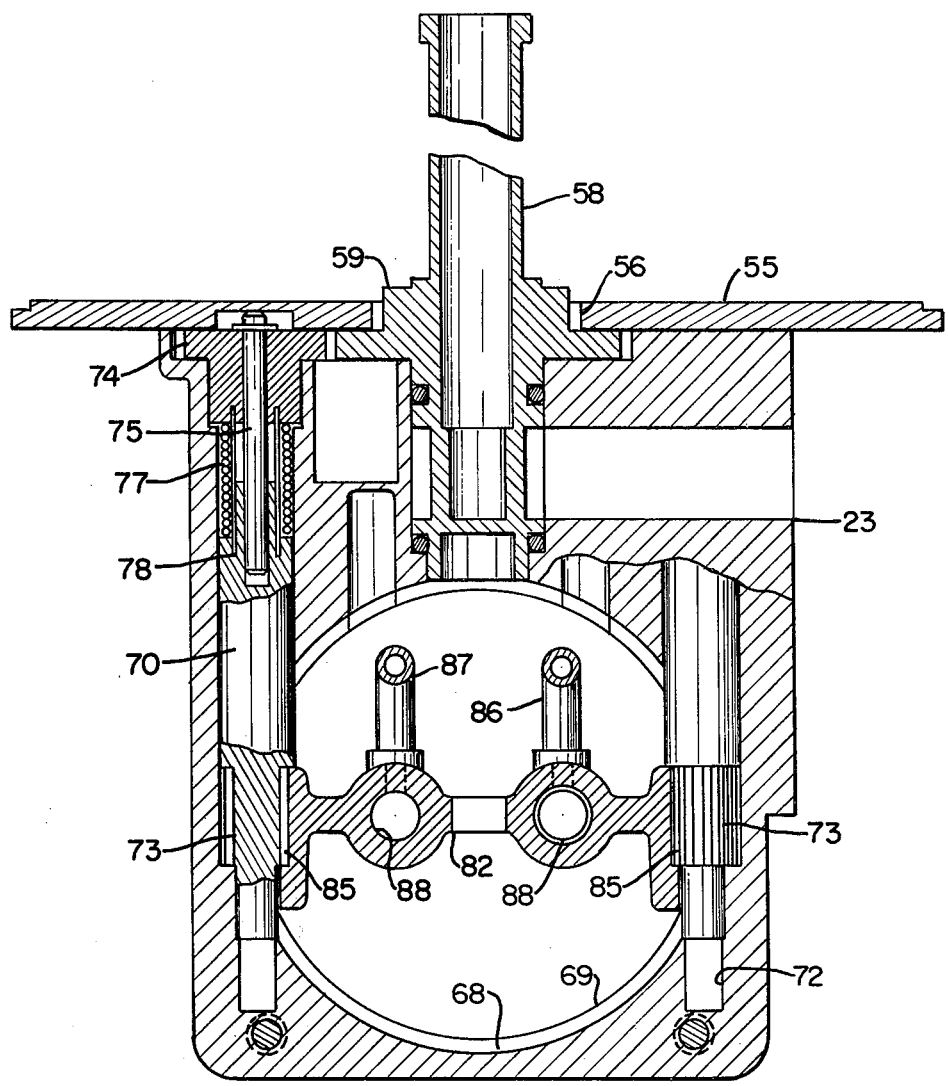
FIG. 8 is a vertical sectional view of the preferred form of power drive means employed to rotate the sprinkler head of the present invention.
Figure 9:
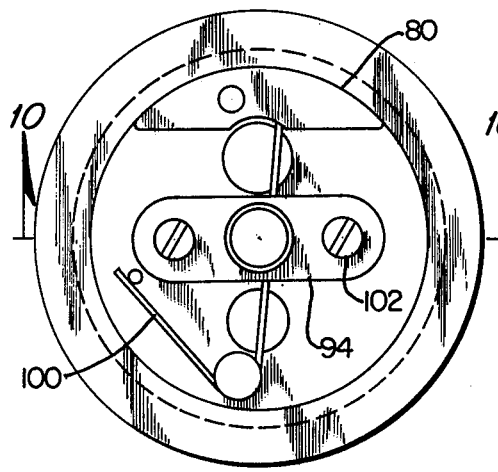
FIG. 9 is an end view of the power drive piston illustrated in FIG. 8.
Figure 10:
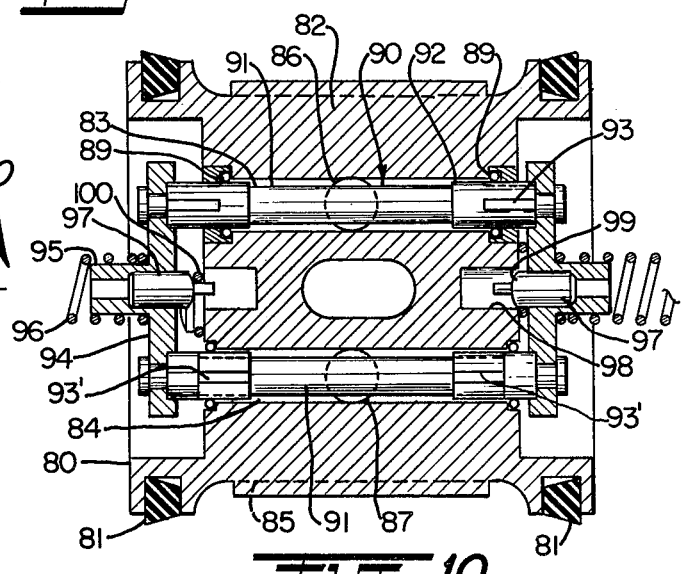
FIG. 10 is a cross-sectional view of the power drive piston FIG. 9 taken about lines 10—10 of FIG. 9.

Referring to FIGS. 7 and 8, each individual sprinkler head S is made up broadly of a power drive piston unit 10 which imparts rotation at a controlled rate of speed to a nozzle block assembly 11. The nozzle block assembly is supported on the upper end of a generally cylindrical casing 53 which is disposed in inner concentric relation to a stationary cylindrical housing 54. The housing 54 is secured to a circular mounting plate 55 directly above the power drive piston assembly 10, and the casing 53 is ribbed on its external surface to slide in vertical slots on the inner surface of the housing 54 so as to be fixed against rotation while being free to slide axially of the housing. The lower edge of casing 53 is normally spaced above the base plate 55 by spring-loaded connecting bolts 166 which as shown have lower enlarged ends or heads 164 seated against the undersides of openings 165 in the bottom wall 66' of the body 66. The bolts 166 extend upwardly at equally spaced intervals through the outer wall of the body and through the plate 55 for threaded connection into bores formed in the lower end of the casing 53. Return springs 57 normally retain the casing in a lower or retracted position within the housing 54. A central opening 56 in the mounting plate permits upward extension of a drive sleeve 58, the drive sleeve having a spur gear 59 at its lower end and diametrically opposed protuberances or teeth 60 at its upper end. The drive sleeve is adapted to be inserted into the internally splined, middle drive sleeve 12' which in turn is inserted concentrically within sprinkler drive sleeve 12 such that the teeth 60 and 60' intermesh with the splined portions of the middle and sprinkler sleeves 12 and 12', respectively, and the rotation is imparted to the middle and sprinkler drive sleeves 12 and 12'. The upper extremity of the driven sleeve 12 in turn is provided with a base plate 64 which is affixed to the underside of nozzle block 65.

The power drive piston assembly 10 is comprised of a relatively thickwall-walled body and a generally cylindrical chamber 68 having its longitudinal axis extending horizontally or in a direction normal to the longitudinal axis of the casing 53 and having opposite end walls 68', the chamber 68 housing a piston 69 therein. A pair of gear shafts 70 extend vertically through openings in opposite sidewalls of the chamber 68, each gear shaft having a lower extremity of reduced diameter inserted into a bore 72 in the bottom wall of the chamber 68, a pinion 73 which communicates with the interior of the chamber and an upper spur gear 74 which is fixed to the upper end of a shaft 75, the lower end of which is inserted into and forms an axial continuation of the spur gear shaft 70. A clutch spring 77 is disposed in surrounding relation to a sleeve 78 which extends between the spur gear 74 and upper end of the gear shaft 70 in outer concentric relation to the shaft 75 so that rotation of the gear shaft 70 in one direction will impart rotation through the clutch spring 77 to the spur gear while permitting the gear shaft to rotate independently of the spur gear 74 in the opposite direction. The spur gears 74 are aligned for intermeshing engagement with diametrically opposed teeth on the driven gear 59 of the drive sleeve 48 and, in a manner to be described, will impart rotation to the driven gear in response to linear or slidable movement of the piston 69 through the chamber 68.

In the preferred form as shown in FIGS. 7 to 12, piston 69 has a pair of generally circular, disk-shaped end plates 80, each end plate 80 being grooved on its external surface to receive a wedge-shaped seal ring 81, and the end plates are interconnected by a relatively flat, web-shaped horizontally extending body portion 82 which houses a pair of inlet and outlet shuttle valves 83 and 84 to be hereinafter described. As best seen from FIG. 7, opposite sides of the body 82 of the piston 69 are provided with racks 85 in the form of vertically extending teeth which intermeshingly engage the pinions 73 of the respective gear shafts 70 so that linear or axial sliding movement of the piston through the chamber will cause rotation of the gear shafts 70 and of the interconnected spur gears 74 whereby to impart rotation to the gear 59 for rotation of the nozzle block assembly 11. The piston undergoes reversible movement through the chamber 68 under the control of water which is delivered under pressure through inlet and outlet ports 86 and 87 to the respective inlet and outlet shuttle valves 83 and 84. To this end, a pair of through bores 88 extend closely spaced juxtaposed relation through the body 82 and opposite end plates 80, each bore provided with O-ring seals 89 at opposite ends. An inlet shuttle valve stem 90 is disposed in one of the through bores and has an intermediate portion 91 of reduced diameter, enlarged end portions 92 at opposite ends of the stem, and circumferentially spaced slots 93 extend for the greater length of the enlarged end portions 92 from their outermost extremities. Correspondingly, the outlet valve has an intermediate stem portion 91 of reduced diameter with respect to the enlarged end portions 92, and slotted portions 93' extend along the greater length of the end portions but in axially offset relation to the slotted portions 93 of the inlet valve. Here the enlarged end portions 92 of the outlet valve are effectively reversed with respect to those of the inlet valve so that the slots 93' are disposed at the innermost extremities of the end portion for a purpose to be hereinafter described.

Opposite ends of the inlet and outlet valve stems 91 are interconnected by an end strap 94, each end strap having a centrally located, axially protruding protuberance 95 adapted to receive the end of a coiled spring 96 and an inwardly directed valve lock 97 is aligned with a counterbore 98 in each end 80 of the piston, the valve lock 97 having an inwardly facing generally conical surface 99 which abuts a valve release spring 100 affixed to the end 80 of the piston. The valve release spring 100 is defined by a bent wire of generally inverted V-shaped configuration, the closed end of the V being clamped to the end surface of the piston by a suitable fastener such as screw 102 with a longer side of the V-shaped wire element extending downwardly across the entrance to the counterbore 98 in abutting relation to the conical surface 99 of the valve lock 97. The inlet and outlet valve stems are so dimensioned with respect to the through bores that the enlarged ends sealingly but slidingly engage the seals at each end of the bore, and the slotted portions 93 and 93' are axially offset with respect to one another so that for example in the relationship shown in FIG. 10 where the inlet and outlet valve stems are shifted to the left, the lefthand solid section of the enlarged end portion is aligned with the seal so as to be closed to prevent discharge of fluid therethrough while the righthand end of the inlet valve stem has the slotted portion aligned with the seals to permit removal of fluid. Conversely, the righthand end of the outlet valve is closed while the lefthand end is open. Thus assuming that water is introduced under pressure through the inlet port 86 it will be free to pass outwardly through the righthand end of the inlet valve stem into the main piston chamber and will rapidly build up pressure behind the piston causing it to move or advance to the left through the piston chamber. The racks 85 along opposite sides of the piston will accordingly cause the gear shaft pinions 73 to be rotated, one being rotated in a clockwise direction and the other in a counterclockwise direction. This rotation will be imparted only to one of the drive gears 74 which intermesh with the central driven gear as a result of the clutch spring arrangement. However, when the coiled spring 96 engages one end wall 68' of the chamber it will begin to resist continued advancement of the piston; an end stop 100' projects into the chamber 68 from each end wall 68' and ech has an inner tapered end which is aligned with the free end of the spring 100. When the end stop 100' engages the spring 100 it will displace it laterally away from the counterbore so as to permit the valve lock 97 to enter the counterbore 98 and to cause the entire valve stem assembly to be shifted to the right. When this occurs, the righthand end of the inlet valve stem will be shifted to a closed position with respect to its seal, but the outlet valve stem will be shifted to an open position at its righthand end thereby permitting the introduction of water under pressure from the right side of the piston chamber through the outlet valve where it is discharged through the outlet valve port 87. Simultaneously water under pressure introduced through the inlet valve will reverse its flow through the lefthand end of the valve, since the slotted portion will have become aligned with the seals to permit the introduction of water into the opposite side of the piston chamber 68. As the pressure builds up in the opposite or lefthand side of the piston chamber 68 and overcomes that of the righthand side, the piston 69 will begin to travel in the opposite direction thereby causing the pinions 73 on the gear shafts 70 to be rotated in the opposite direction.

Accordingly, the gear racks 85 will rotate the pinions 73 but the drive gear 74 which imparted rotation to the central driven gear 59 will be released from rotation by its clutch spring whereas the opposite drive gear 74 will be engaged to rotate with its gear shaft 70 and impart rotation to the central driven gear 59 in the same direction as the first gear. Preferably a ratio on the order of 2 to 1 is established between the central gear 59 and the outer drive gears 74 so that each drive gear will rotate the central driven gear either slightly over or under approximately 180°, or one-half, of a complete revolution for each stroke of the piston 69 so as to avoid the build-up of excess water at the end of each stroke.

It will be noted from FIG. 7 that the inlet valve port is connected by a flexible tube 86' to a bore 103 at the upper end of the piston chamber which communicates with the main inlet port 23 for water from the timer unit. The flexible tubing 86' is sized so as to recieve but a limited quantity of the water supplied through the inlet port 23 but which is more than sufficient to exert the necessary pressure across the end of the piston to impart linear advancement to the piston 69 through the chamber. Similarly, as shown in FIG. 6A, the outlet valve port 87 is connected by flexible tubing member 87' to a discharge tube 104 which is located in the housing 25 directly beneath the timer dial 26. The speed of travel of the power drive piston is controlled by a threaded valve stem 105 which is threadedly adjustable with respect to valve seat 105' above the discharge tube so as to regulate the rate of discharge of water through the outlet valve 87 and thus the rate of travel of the piston 69 through the chamber 68. A filter section which may suitably consist of fine mesh screens 107 with a layer of sand 106 therebetween permits water to seep through the upper end of the tube 104 directly beneath the cover plate so as to pass by gravity through the housing 25 and away from the base plate 55 to the ground area surrounding the sprinkler head S.

NOZZLE BLOCK ASSEMBLY

An important feature of the present invention resides in the nozzle block assembly 11 and its contour control which makes it capable of selectively covering irregular patterns or areas to be irrigated or sprinkled. To this end, as shown in FIGS. 2, 7 and 11, the nozzle block assembly 11 is housed in a bonnet or casing 110 of inverted generally cup-shaped configuration having a downwardly divergent, generally conical sidewall portion 111 verging into a vertical wall portion 112. A wide aperture 113 is formed in the downwardly divergent sidewall 111 and a relatively narrow, smaller aperture 114 is formed in the sidewall 111 diametrically opposite to the aperture 113. The upper edge of the sidewall 111 is formed integrally with a top panel or cover 115, the outer peripheral edge of which projects beyond the wall portion 112 and is adapted to seat upon a ledge 116 at the upper end of the inner wall of the housing 54.

The nozzle block proper which is designated at 65 has a lower circular mounting plate 117 to which is attached the base plate 64, and an upper body portion 118 is affixed to the underside of the cover 115 by a suitable fastener 119 with a multi-hole nozzle assembly 120 facing the wider aperture 113. A main cavity 121 extends rearwardly and horizontally away from the assembly 120 for insertion of a nozzle control shaft 122 affixed to a cam follower element 123 which is disposed in adjacent facing relation to the smaller aperture 114. The nozzle control shaft 122 is slidable through the cavity 121 under the control of the cam follower 123 and has a nozzle control or shut-off block 124 at the end opposite to the cam follower which is provided with a series of plungers 125 axially aligned with a series of rear nozzles 126 in the nozzle assembly 120. In addition, the nozzle block has an inlet port 127 projecting upwardly through the center of the body to communicate with the cavity 121 formed immediately behind the nozzle assembly 120. The port 127 is aligned with the upper reduced end of the driven sleeve 12 for the introduction of water under pressure into the cavity 127 behind the nozzle assembly. The force of the water directed upwardly against the upper wall of the cavity 121 will cause the entire casing 53 and nozzle block assembly to overcome the force of the return springs 57 and to rise from the lowered position shown in FIG. 7 to a raised position in which the bonnet is lifted above the ledge 116 so as to extend the nozzle assembly 11 above the housing 54.

The nozzles 126 are in the form of a series of horizontally directed orifices or limited openings arranged in radially extending, closely-spaced, side-by-side relation to one another across the length of the rear nozzle assembly 120, and the plungers 125 are arranged to correspond in size and spacing with the size and spacing of the nozzles. The plungers are axially aligned with the nozzles so as to be movable toward and away from the nozzles under the control of the cam follower 123 in a manner to be hereinafter described. It will be noted too that the plungers 125 are of progressively increased length so that for instance the longer of the plunger elements will start to enter its respective nozzle followed by the next longer plunger when the nozzle control block 124 is advanced toward the nozzles. In this way, each plunger in succession will shut off its nozzle while permitting water to be directed through the other nozzles as the plungers are advanced toward the nozzles. Moreover, referring to FIGS. 12 and 13, the trajectory of the water discharged through each nozzle 126 is controlled by a front nozzle plate 128 which has a series of nozzle orifices 129 aligned with each of the respective nozzles 126 on the rear nozzle assembly 120. The angular disposition or trajectory of each nozzle is selected according to the area to be sprinkled. For instance, in the preferred embodiment illustrated the nozzle aligned with the longer plunger element may be disposed on the order of 20° to 22° above horizontal to impart a longer throw to the water stream while the nozzle 126 at the opposite end of the nozzle plate opposite to the shorter plunger is directed at an angle of 1° to 2° below horizontal to impart the least thrown. The intermediate nozzles between the outer flanking nozzles may range in angular disposition between 1° above horizontal to 14°. This specific angular relationship is given more for the purpose of illustration and not limitation and it may be suitably varied or adjusted according to the water pressure and area to be covered. For this reason, most desirably the nozzle plate 128 is removably attached to the rear nozzle assembly 120, such as, by fasteners 128' so as to permit substitution or interchangeability with other nozzle plates. In addition, deflector member 158 attached to the front surface of nozzle plate 128 has a series of downwardly projecting tabs 129' which partially cover the selected orifices 129 for example when it is desired to fan out or direct the stream of water in a downward direction from that respective orifice.

The nozzle block 65 as described rests within the housing 54 on a cam programmer ring 130 which forms an inward radial extension at the upper end of the casing 53 as shown in FIGS. 7 and 11. The cam programmer ring is comprised of an annular cover plate 132 having a series of radial slots 133 at closely spaced circumferential intervals, and the cover plate rests on inner and outer spaced concentric vertical walls 134 and 135, respectively at the upper end of the casing 53. The walls 134 and 135 are interconnected by an annular bottom plate 136 so as to form a circular channel 137 directly beneath the cover plate 132. Moreover the outer wall 135 is of reduced diameter with respect to the external wall of the casing 53 and has a series of upwardly directed slots 140 at closely spaced circumferential intervals corresponding to the spacing between the radial slots 133 in the cover plate.

In order to drive the cam follower 123 and thus to control the spray pattern of the nozzle block, a series of closely spaced, upwardly projecting cams or pins 142 are disposed for radial movement through the radial slots 133, the radial movement of each cam 142 being controlled by a cam screw 144. Each cam screw includes a threaded portion or shank 145 projecting radially across the channel with its inner end seated in a slot formed in the inner wall portion 134 and its outer end provided with a bushing or grooved head 146 which is adapted to be inserted into a slot 140 in the outer wall portion 135 and is provided with a suitable slot or recess 147 on its external surface facing outwardly and away from the wall portion 135 for insertion of a wrench or tool in order to rotate the screw. For example, the outer end may be formed with a generally hexagonal recess 147 adapted to accommodate an Allen wrench so as to permit rotation of the cam screw within the channel. In turn, each cam 142 is affixed to a cam nut 148 which is threaded onto the shank portion of a respective cam screw with the cam projecting upwardly through the respective cam slot in the cover plate and therefore being constrained against rotation with the cam screw. Accordingly as each cam screw is rotated, the associated cam member 142 is advanced radially along the radial slot formed in the cover plate.

Referring to FIG. 11, the cam follower 123 has a generally venturi-shaped slot 150 formed on its undersurface defined by the oppositely diverging walls 151 and 152 of the slot so as to define a cam track which rides in a circular direction above the channel 137 and the radial slots 133 formed in the cover plate of the cam programmer ring. As the cam follower rides along the cam programmer ring, it is caused to move radially inwardly and outwardly with respect to the central axis of the sprinkler head according to the radial disposition of the cams 142 and thus create the desired contour or pattern of spray by the nozzle assembly. Thus, if a cam 142 is set at its innermost radial point closer to the axis of the head, the cam follower 123 will correspondingly be advanced inwardly toward the center as the cam rides along the inner cam track 151 and accordingly the plungers will be advanced to a position completely cutting off the flow or water through the nozzle assembly 120. Conversely, if a cam 142 is located at its outermost radial point on the cam screw, it will engage the outer track 152 thereby causing the cam follower and its nozzle control shaft to move away from the nozzle assembly 120 and permit a discharge of water through all of the nozzles. In practice, in the manner illustrated in FIG. 11, the cams 142 are adjusted to various different intermediate settings for example in establishing the various spray patterns as illustrated in FIG. 1; and the venturi-shaped configuration of the cam follower will permit smooth transition and movement of the nozzle control shaft and plungers between the different positions according to the settings of the cams 142. Stated another way, the pins are set at various intermediate intervals or points between the far extremes in order to open a greater or lesser number of nozzles to create the desired patterns, for example as illustrated in FIG. 1.

It will be evident from the foregoing that each sprinkler head is individually controllable to select a desired rate of rotation of the head, the pattern or contour to be sprayed and the individual sprinkling cycle independently of the other heads. Thus the rate of rotation is readily effected by rotation of the threaded stem 105 to regulate the amount of water flow from the outlet side and specifically the outlet valve 87 of the drive piston assembly 10. For instance, as the stem is threaded inwardly to reduce the rate of water flow from the outlet valve, the flow into the inlet valve 86 from the main inlet port is correspondingly reduced and the rate of linear advancement of the piston correspondingly reduced. The sprinkling cycle is conveniently regulated in the same location on the head by lifting the upper end of the time setting shaft 14 so as to disengage the spur gear 26 from the gear reducer and advance the pointer to the desired time and minutes on the dial. The shaft is then depressed in order to re-engage the spur gear pins 160 with the openings in the collar 162 beneath the spur gear. The spray pattern or contour is modified or controlled by turning the individual screw settings for the cams 142. It will be noted in this connection that as each cam is advanced toward the center or longitudinal axis of the casing it will cause the cam follower to be advanced inwardly toward the center a corresponding amount which in turn will cause the plungers 125 to move toward the nozzles 126. As each plunger approaches an aligned nozzle it will be operative to reduce the pressure of water through that nozzle so as to have the effect of reducing the trajectory or throw of water from that nozzle before the nozzle becomes completely closed by the plunger. Further, the plungers achieve a more positive-acting and direct method of closure of the nozzles in being positioned to move in a radial direction in direct response to radial movement of the cam follower 123 along the cam programmer ring.

Referring to FIG. 2 in conjunction with FIG. 7, each sprinkler head is caused to pop up or rise in response to water pressure acting against the upper wall of the cavity 121 and overcoming the resistance of the springs 57. At the end of the sprinkling cycle of each head, the inner nozzle assembly will return to its retracted position under the urging of the springs 57, as shown in FIG. 7. Any water remaining in the interior of the head, particularly in the lower chamber 68 may be readily drained through the lower drain openings 168 by manually pressing down against the nozzle assesmbly 11 so that the casing 53 will unseat the lower ends 164 of the spring-loaded connecting bolts 166 from the openings 165 which communicate with the drain openings 168 in the end walls 68'. Once released the upper end 115 of the nozzle assembly will return to its normally flush relation to the housing 54.

Although the present invention has been described with particularly relative to the foregoing detailed description of the preferred embodiment, various modifications, changes, additions and applications other than those specifically mentioned herein will be readily apparent to those having normal skill in the art without departing from the spirit and scope of this invention.

I claim:

1. A sprinkler system comprising in combination:
   a source of water supply under pressure and a common water supply line connected thereto;
   a plurality of sprinkler heads at spaced intervals along said water supply line, each sprinkler head having timer control valve means interposed between an inlet port adapted to receive water from said water supply line and a discharge port connected to said sprinkler head, said control valve means being responsive to rotation of said sprinkler head to be movable between a first position diverting water from said water supply line through said inlet and discharge ports and a second position closing said discharge port and permitting water to flow through said supply line to each next sprinkler head in succession;
   a rotatable nozzle assembly in each sprinkler head communicating with said discharge port; and
   water operated drive means in each sprinkler head responsive to the flow of water under pressure through said discharge port to continuously rotate said sprinkler head.

2. A sprinkler system according to claim 1, said control valve means including indexing means to automatically reposition said timer control valve means in said first position after completion of the sprinkling cycle of its associated sprinkler head.

3. A sprinkler system according to claim 2, said timer control valve means including a rotatable timer shaft coupled for rotation in response to rotation of its associated sprinkler head to control the duration of the sprinkling cycle of its associated sprinkler head.

4. A sprinkler system according to claim 1, said timer control valve means including a valve member slidable within a valve chamber between said first and second positions, a cylinder and piston member movable through said cylinder operatively connected to said valve member and responsive to changes in differential pressure on opposite sides of said piston member to advance said valve member between said first and second positions.

5. A sprinkler system according to claim 4, including an indexing rack on the external surface of said piston, a rotatable timer shaft gear-coupled for rotation in response to rotation of said sprinkler head including a pinion disposed for intermeshing engagement with said indexing rack, said indexing rack being movable to rotate said pinion and timer shaft upon completion of the sprinkling cycle of the associated sprinkler head in preparation for its next cycle of operation.

6. A sprinkler system according to claim 4 including a piston rod extending from one end of said piston, said valve member being shiftably mounted on said piston rod and movable independently of said piston rod between said first and second positions.

7. A sprinkler system according to claim 6, said piston rod being hollow to establish communication between said inlet port and an end of said cylinder opposite to said piston rod, and check valve means normally interrupting flow of water between opposite ends of said piston and operative in response to movement of said valve member to said second position and reduction in water pressure against the end of said piston opposite to said piston rod to move to an open position permitting flow of water through said hollow piston rod to the end of said cylinder opposite to said piston rod.

8. A sprinkler system according to claim 5, said pinion being fixed for rotation of said timer shaft in one direction of rotation and said timer shaft being independently rotatable with respect to said pinion in the opposite direction of rotation.

9. A sprinkler system according to claim 8, a closure member rotatable with said timer shaft and provided with an aperture adapted to be aligned with a drain opening in said piston cylinder to drain water from said cylinder behind said piston when said timer shaft reaches its zero setting at end of the sprinkling cycle.

10. In a sprinkler system having a source of water supply under pressure and a water supply line connected thereto, a sprinkler head in said water supply line having timer control valve means interposed between an inlet port adapted to receive water from said water supply line and a discharge port connected to said sprinkler head, said timer control valve means being responsive to rotation of said sprinkler head to be movable between a first position diverting water from said water supply line through said inlet and discharge ports and a second position closing said discharge port, said timer control valve means including indexing means to automatically reposition said timer control valve means in said first position after completion of the sprinkling cycle, a valve member slidable within a valve chamber between said first and second positions, and a piston member operative connected to said valve member and responsive to changes in differential pressure on opposite sides of said piston to advance said valve member between said first and second positions.

11. In a sprinkler system according to claim 10, said indexing means disposed on the external surface of said piston, a rotatable timer shaft gear-coupled for rotation in response to rotation of said sprinkler head including a pinion disposed for intermeshing engagement with said indexing means, said indexing means being movable to rotate said pinion and timer shaft to their initial settings upon completion of the sprinkling cycle in preparation for its next cycle of operation.

12. In a sprinkler system, a hydraulically actuated power drive piston assembly comprising:
a piston chamber having opposite end walls;
a double-acting piston head slidable through said chamber between opposite end walls, said piston head having axially spaced opposite ends sealed with respect to said chamber;
at least one shuttle valve extending axially of said piston head having an intermediate inlet port and outlet ports at opposite ends of said piston, said shuttle valve including a valve stem movable in an axial direction independently of said piston between opposite end limits of movement so as to alternately close one of said outlet ports while opening the other of said outlet ports;
a member to be rotated; and
means operatively associated with said piston head to convert the linear movement of said piston head into rotational movement of the member to be rotated.

13. In a sprinkler system according to claim 12, said valve stem being movable in a direction opening said outlet port at one end of said piston head opposite to the direction of movement of said piston head through said chamber, and second valve means operative to remove water from the piston chamber at the opposite end of said piston head.

14. In a sprinkler system according to claim 13, said second valve means being defined by a second shuttle valve in said piston head including an intermediate outlet port and inlet ports at opposite ends of said piston head, and a second valve stem operatively connected to said first shuttle valve stem and movable therewith to open said inlet port at the end of said piston head when the outlet port of said first shuttle valve means at the same end of said piston head is closed and to close said inlet port at the opposite end of said piston when said inlet port of said first shuttle valve means is open.

15. In a sprinkler head according to claim 12, including resilient means at opposite ends of said piston head movable into engagement with the opposite end walls of said piston chamber whereby to shift said shuttle valve means between opposite end limits of movement to reverse the direction of travel of said piston head.

16. In a sprinkler system according to claim 16, including a second spring element operative to resist displacement of said shuttle valve stem member under the urging of said first resilient means until a predetermined spring force is developed in said resilient means.

17. In a sprinkler system according to claim 15, including an end connector interconnecting opposite ends of said shuttle valve stem members, a first resilient member extending in an axial direction away from each end of said piston head and a second resilient member extending in an axial direction toward each end of said piston head, said second resilient member being operative to resist displacement of said first and second shuttle valve members at the end of each stroke of said piston until a predetermined spring force is developed in said first resilient member as it moves into engagement with an end wall of said piston chamber.

18. In a sprinkler system, a hydraulically actuated power drive piston assembly comprising:
a piston chamber having opposite end walls;
a double-acting piston slidable through said chamber between opposite end walls, said piston having axially spaced opposite ends sealed with respect to said chamber;
a first shuttle valve extending axially through said piston having an intermediate inlet port and outlet ports at opposite ends of said piston, said shuttle valve including a first valve stem member movable in an axial direction independently of said piston between opposite end limits of movement so as to alternately close one of said outlet ports while opening the other of said outlet ports;
a second shuttle valve extending axially through said piston including an intermediate outlet port and inlet ports at opposite ends of said piston, and a second valve stem operatively connected to said first shuttle valve stem and movable therewith to open said inlet port at the end of said piston when the outlet port of said first shuttle valve at the same end of said piston head is closed and to close said inlet port at the opposite end of said piston when said inlet port of said first shuttle valve is open;
a member to be rotated; and
indexing means operatively associated with said piston to convert the linear movement of said piston into rotational movement of the member to be rotated.

19. In a sprinkler system according to claim 18, said first valve stem being movable in a direction opening said outlet port at one end of said piston opposite to the direction of movement of said piston through said chamber.

20. In a sprinkler system according to claim 18, said member to be rotated defined by a pinion mounted on a gear shaft, and said indexing means defined by a rack on the external surface of said piston intermeshing with said pinion whereby said pinion is rotated in response to axial movement of said piston through said chamber.

21. In a sprinkler system according to claim 20, including indexing racks on diametrically opposed sides of said piston, said pinion rotatable in response to linear movement of one of said indexing racks in one direction through said chamber and a second pinion having a gear shaft rotatable in response to linear movement of the other of said indexing racks through said chamber, and a drive sleeve gear-coupled to said gear shafts to rotate in a common direction in response to rotation of each of said gear shafts.

22. In a sprinkler system according to claim 18, including an end connector interconnecting opposite ends of said first and second shuttle valve stem members, a first resilient member extending in an axial direction away from each end of said piston and a second resilient member extending in an axial direction toward each end of said piston, said second resilient member being operative to resist displacement of said first and second shuttle valve members at the end of each stroke of said piston until a predetermined spring force is developed in said first resilient member as it moves into engagement with an end wall of said piston chamber.

23. A sprinkler head unit comprising:
a base including an inlet port adapted to be connected to a source of water under pressure;
a generally tubular, open-ended housing mounted on said base having its longitudinal axis normal to the longitudinal axis of said piston chamber;
a casing disposed in inner concentric relation to said housing, said casing being fixed against rotation relative to said housing but movable axially of said housing, said casing having an upper cam programmer assembly forming at least a partial closure across the upper end of said casing; and
a nozzle assembly supported on the upper end of said casing but rotatable independently thereof, said nozzle assembly including a series of nozzle orifices arranged to extend in a common substantially radial direction away from the center of said casing, each nozzle extending at a different vertical angle to cover a different area to be irrigated, a liquid inlet communicating with said nozzle orifices, and a nozzle control member including a series of plungers aligned with said nozzles and a cam follower operative to control radial movement of said plungers into and away from said nozzle orifices.

24. In a sprinkler system according to claim 23, including a series of movable cam members arranged in closely-spaced circumferential relation on said cam programmer, and said cam members being sequentially engageable with said cam follower such that upon rotation of said cam follower relative to said cam programmer, said plungers are selectively movable into and away from said nozzle orifices to control the size of the area covered by the discharge of water through said nozzle assembly.

25. In a sprinkler system according to claim 23, said base including a piston chamber therein, a rotatable drive shaft extending downwardly from said nozzle assembly including a driven gear at its lower end; a pair of drive gear shafts disposed in said base on opposite sides of said piston chamber and arranged on axes parallel to the axis of said driven shaft, each of said drive shafts having a pinion disposed to at least partially extend into the interior of said piston chamber and a drive gear in intermeshing relation to the driven gear on said driven shaft; and a double-acting piston head slidable in said piston chamber including drive means responsive to water pressure of the water directed through said inlet port to reversibly drive said piston head through said piston chamber, an indexing rack on diametrically opposed sides of said piston head disposed in intermeshing engagement with said drive shaft pinions, said pinions being so connected to said drive shafts as to rotate their respective drive shafts in one direction only and to be rotatable independently of the drive shafts in the opposite direction of rotation so that advancement of said piston head through said piston chamber in one direction will cause one of said pinions to rotate said driven shaft and reverse movement in the opposite direction will cause the other of said pinions to rotate said driven shaft in the same direction as the one pinion whereby to impart continuous rotational movement to said nozzle assembly.

26. A sprinkler head unit according to claim 23, each of said nozzle orifices including a rear orifice portion axially aligned with a respective plunger and a front orifice portion inclining at a vertical acute angle away from said rear surface portion.

27. A sprinkler head unit according to claim 26, each front orifice extending at a different angle away from its respective rear orifice portion, and deflector means across the exit ends of selected of said front orifice portions whereby to spread the water discharge from said respective front orifice portions.

28. A sprinkler head unit according to claim 23, said cam programmer including a threadedly adjustable member upon which each of said cam members is mounted, said threadedly adjustable members extending radially at equally spaced circumferential intervals.

29. A sprinkler head unit comprising:
a base including a piston drive chamber therein and an inlet port adapted to be connected to a source of water under pressure;
a generally tubular, open-ended housing mounted on said base having its longitudinal axis normal to the longitudinal axis of said piston chamber;
a casing disposed in inner concentric relation to said housing, said casing being fixed against rotation relative to said housing but movable axially of said housing, said casing having an upper nozzle programmer assembly forming at least a partial closure across the upper end of said casing;
a nozzle assembly supported on the upper end of said casing but rotatable independently thereof, said nozzle assembly including a series of nozzle orifices arranged to extend in a common substantially radial direction away from the center of said casing, each nozzle extending at a different vertical angle to cover a different area to be irrigated, and a liquid inlet communicating with said nozzle orifices;
a rotatable drive shaft extending downwardly from and drivingly connected to said nozzle assembly including a driven gear at its lower end;
at least one drive gear shaft extending upwardly from said piston chamber having a pinion disposed to at least partially extend into the interior of said piston chamber and a drive gear in intermeshing relation to the driven gear on said driven shaft;
a piston slidable in said piston chamber including drive means responsive to water pressure of the water directed through said inlet port to drive said piston through said piston chamber, an indexing rack on at least one side of said piston disposed in intermeshing engagement with said drive shaft pinion, said pinion being so connected to said drive shaft as to rotate said gear drive shaft and impart rotation to said driven shaft; and
time control valve means responsive to rotation of said sprinkler head to control the sprinkling cycle of said sprinkler head and the delivery of said water into said sprinkler head.

30. A sprinkler head unit according to claim 29, including yieldable support members extending upwardly through said base and connected to said casing, said support members including means normally biasing said casing to a position spaced above said base while said support members normally close a drain opening in said base whereby depressing said casing downwardly to overcome the urging of said means, said support members are movable to a position establishing communication between said drain openings and the interior of said piston chamber.

* * * * *